United States Patent
Geesey (10) Patent No.: US 10,264,780 B1
(45) Date of Patent: Apr. 23, 2019

(54) MOUSEY DUMP

(71) Applicant: Forest Geesey, Chelsea, MI (US)

(72) Inventor: Forest Geesey, Chelsea, MI (US)

( * ) Notice: Subject to any disclaimer, the term of this patent is extended or adjusted under 35 U.S.C. 154(b) by 0 days.

(21) Appl. No.: 16/112,049

(22) Filed: Aug. 24, 2018

(51) Int. Cl.
*A01M 23/00* (2006.01)
*A01M 23/04* (2006.01)

(52) U.S. Cl.
CPC .................. *A01M 23/04* (2013.01)

(58) Field of Classification Search
CPC ....... A01M 23/02; A01M 23/04; A01M 23/18
USPC ........................................... 43/69, 74
See application file for complete search history.

(56) References Cited

U.S. PATENT DOCUMENTS

| | | | | | |
|---|---|---|---|---|---|
| 1,420,384 | A | * | 6/1922 | Pierini | A01M 23/04 43/69 |
| 1,500,525 | A | * | 7/1924 | Pierini | A01M 23/04 43/69 |
| 1,517,192 | A | * | 11/1924 | Andrew | A01M 23/18 43/69 |
| 1,520,557 | A | * | 12/1924 | Berg | A01M 23/06 43/69 |
| 1,636,745 | A | * | 7/1927 | Johnson | A01M 23/18 43/69 |
| 1,889,276 | A | * | 11/1932 | Dorrien | A01M 23/18 43/69 |
| 2,655,759 | A | * | 10/1953 | Cronberger | A01M 23/04 248/133 |
| 4,706,408 | A | * | 11/1987 | Mellard | A01M 23/04 43/69 |
| 4,876,821 | A | * | 10/1989 | Benzie | A01M 23/04 43/69 |
| 5,477,636 | A | * | 12/1995 | Musket | A01M 1/14 43/114 |
| 8,769,865 | B2 | * | 7/2014 | Cink | A01M 25/004 43/131 |
| 2002/0139039 | A1 | * | 10/2002 | Cairns | A01M 23/04 43/69 |

FOREIGN PATENT DOCUMENTS

GB 162998 A * 5/1921 ............ A01M 23/04

* cited by examiner

*Primary Examiner* — Darren W Ark
*Assistant Examiner* — Danielle A Clerkley
(74) *Attorney, Agent, or Firm* — Vincent Re PLLC (57) ABSTRACT

A system for catching mice includes an improved mousetrap system. The improved mousetrap system includes an unstable platform configured to rest upon a flat surface and extend over an edge of the flat surface and bait situated at an end of the unstable platform. Instability in the unstable platform is configured to cause a mouse to fall and be trapped. In one embodiment, the system includes an unstable platform configured to rest upon a tabletop surface and extend over an edge of the tabletop surface, bait upon an end of the unstable platform, and a mouse catching receptacle located below the unstable platform.

1 Claim, 8 Drawing Sheets

MOUSEY DUMP

TECHNICAL FIELD

This disclosure is related to a device useful to catch rodents, in particular, to a mousetrap using bait to lure a mouse into a trap.

BACKGROUND

The statements in this section merely provide background information related to the present disclosure. Accordingly, such statements are not intended to constitute an admission of prior art.

Mousetraps are known in the art that include a spring force utilized to slap a killing mechanism against a mouse. Such traps leave a dead mouse in plain view and often include a mess that users can be reluctant to clean up.

Mousetraps are alternatively known that use a glue pad to catch the feet of the mouse and hold the mouse indefinitely until the mouse expires. Many people consider such glue pad traps inhumane, as the mouse may take an extended period of time to expire.

Mousetraps are alternatively known that use trap doors or other mechanisms to catch a mouse. Depending upon the embodiment, the user can then be responsible for relocating and releasing the rodent. Such mousetraps can be messy, as the rodent living in the box continues to have bodily functions while trapped in the box. Further, if the box is not checked frequently, the trapped mouse can slowly expire in conditions similar to the glue pad trap.

SUMMARY

A system for catching mice includes an improved mousetrap system. The improved mousetrap system includes an unstable platform configured to rest upon a flat surface and extend over an edge of the flat surface and bait situated at an end of the unstable platform. Instability in the unstable platform is configured to cause a mouse to fall and be trapped. In one embodiment, the system includes an unstable platform configured to rest upon a tabletop surface and extend over an edge of the tabletop surface, bait upon an end of the unstable platform, and a mouse catching receptacle located below the unstable platform.

BRIEF DESCRIPTION OF THE DRAWINGS

One or more embodiments will now be described, by way of example, with reference to the accompanying drawings, in which.

DETAILED DESCRIPTION

Figure 1:
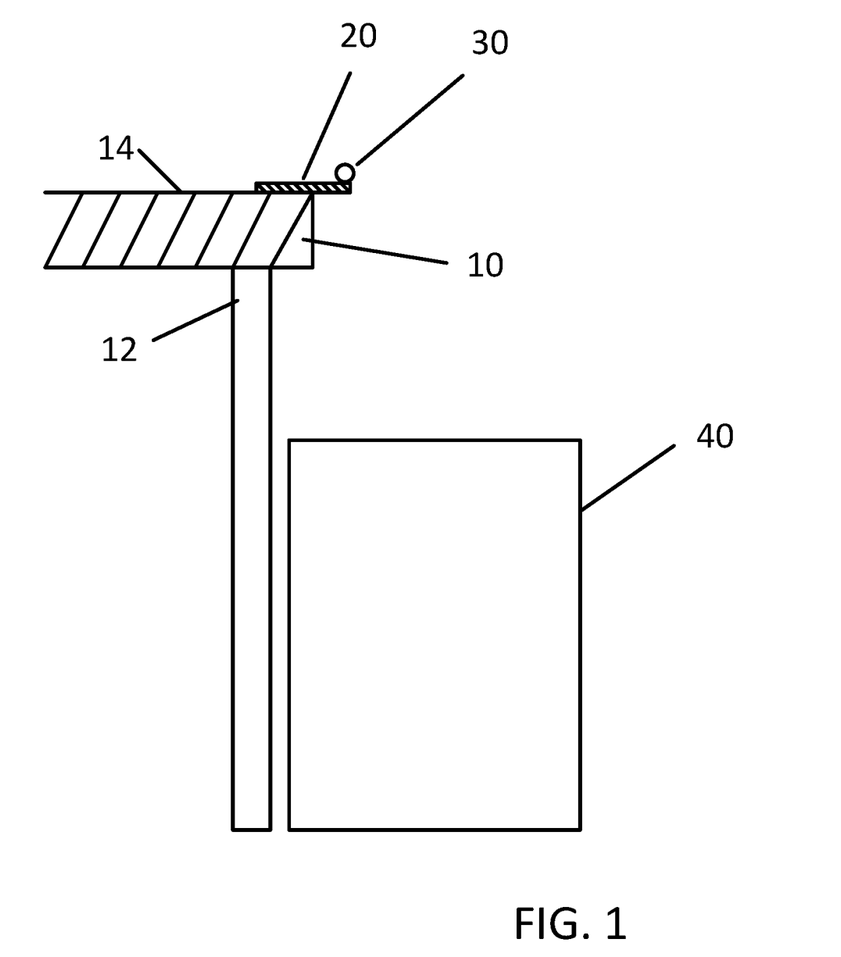
FIG. 1 illustrates an exemplary improved mousetrap system in side view, including an unstable platform situated on an edge of a table and a bait luring rodents onto the unstable platform, with a mouse catching receptacle located under the unstable platform, in accordance with the present disclosure.

Referring now to the drawings, wherein the showings are for the purpose of illustrating certain exemplary embodiments only and not for the purpose of limiting the same, FIG. 1 illustrates an exemplary improved mousetrap system in side view, including an unstable platform situated on an edge of a table and a bait luring rodents onto the unstable platform, with a mouse catching receptacle located under the unstable platform. Unstable platform 20 is illustrated upon tabletop 14 of table 10. Bait 30 is positioned upon an end of unstable platform 20. Bait 30 can be any food product or similar attractant known in the art to attract rodents, including but not limited to cheese, peanut butter, chocolate, etc. Table 10 includes table leg 12. mouse catching receptacle 40 is illustrated positioned under unstable platform 20, such that when platform 20 releases a rodent off of the edge of table 10, the rodent falls into receptacle 40.

Figure 2A:
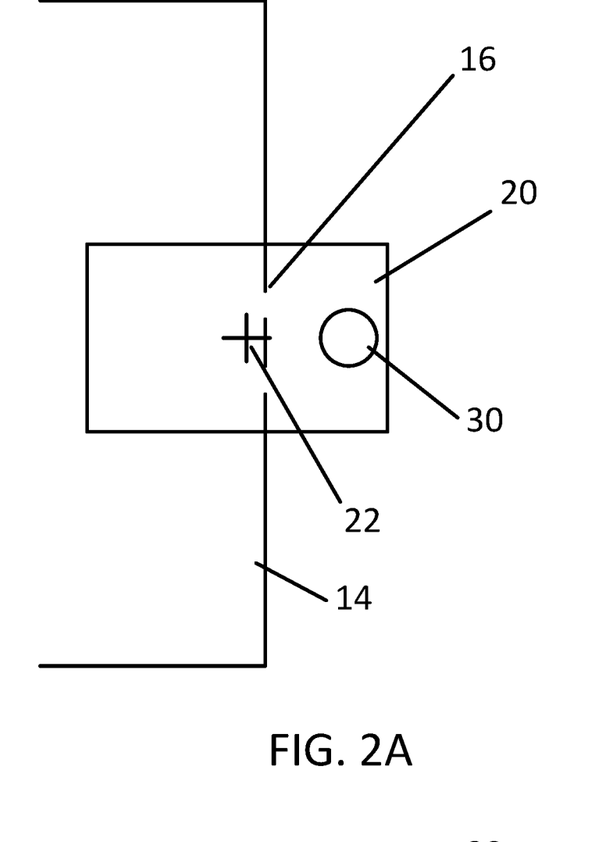
FIG. 2A illustrates the improved mousetrap system of FIG. 1 in top view, illustrating the platform's center of gravity in relation to the edge of the table, in accordance with the present disclosure.

FIG. 2A illustrates the improved mousetrap system of FIG. 1 in top view, illustrating the platform's center of gravity in relation to the edge of the table. Unstable platform 20 is illustrated situated upon tabletop 14. An edge of tabletop 14 under platform 20 is illustrated by dotted line 16. Center of gravity 22 is illustrated which includes a center of gravity for the total mass of platform 20 and bait 30. So long as the center of gravity remains over tabletop 14, platform 20 will remain upon tabletop 14 and not tip over. A user can be provided a recommended bait amount or weight to maintain a predictable center of gravity 22.

Figure 2B:
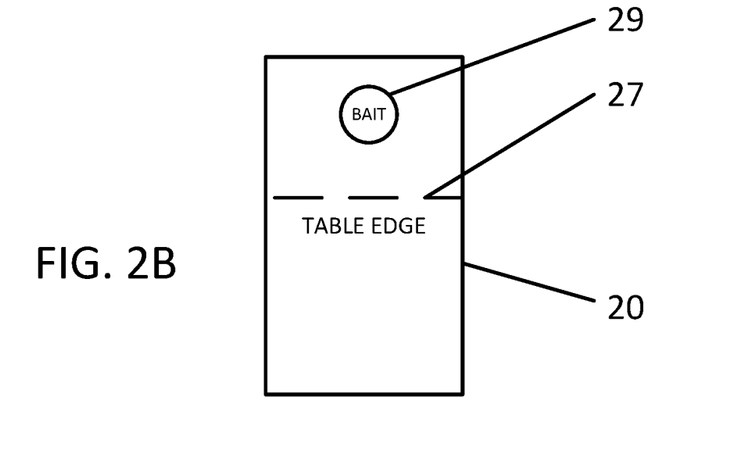
FIG. 2B illustrates a particular exemplary embodiment of the platform of FIG. 2A, with suggested locations for bait and a table edge printed upon the platform, in accordance with the present disclosure.

FIG. 2B illustrates a particular exemplary embodiment of the platform of FIG. 2A, with suggested locations for bait and a table edge printed upon the platform. For ease of use, a top of platform 20 can optionally include print details showing where the bait should go and where a table edge should be aligned. Bait location indicator 29 is illustrated, along with suggested table edge alignment indicator 27.

Figure 3:
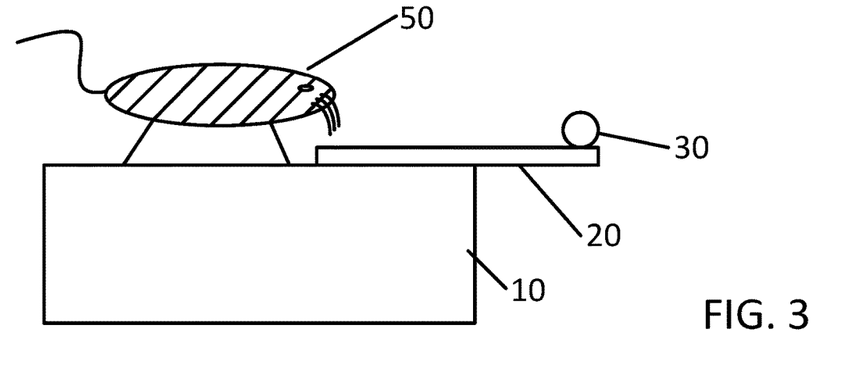
FIG. 3 illustrates the improved mousetrap system of FIG. 1, with a mouse approaching the unstable platform in pursuit of the bait, in accordance with the present disclosure.
Figure 4:
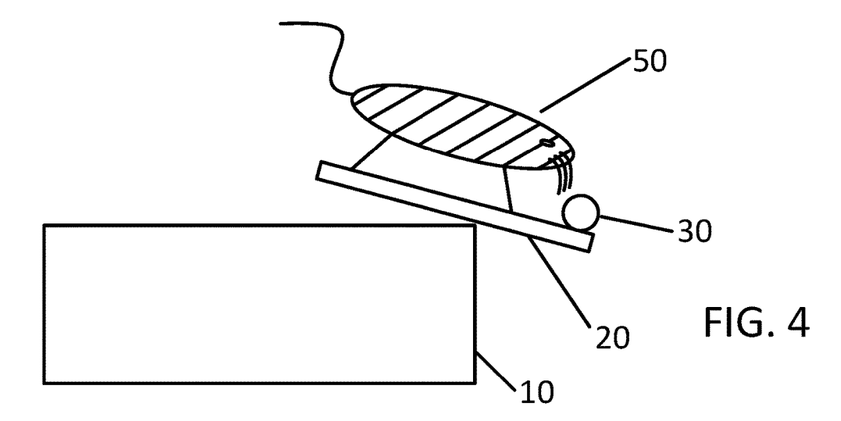
FIG. 4 illustrates the improved mousetrap system of FIG. 3, with the mouse stepping fully onto the unstable platform and a center of gravity of the combined mouse and platform going past an edge of the table under the platform causing the mouse and the platform to tip over the edge, in accordance with the present disclosure.
Figure 5:
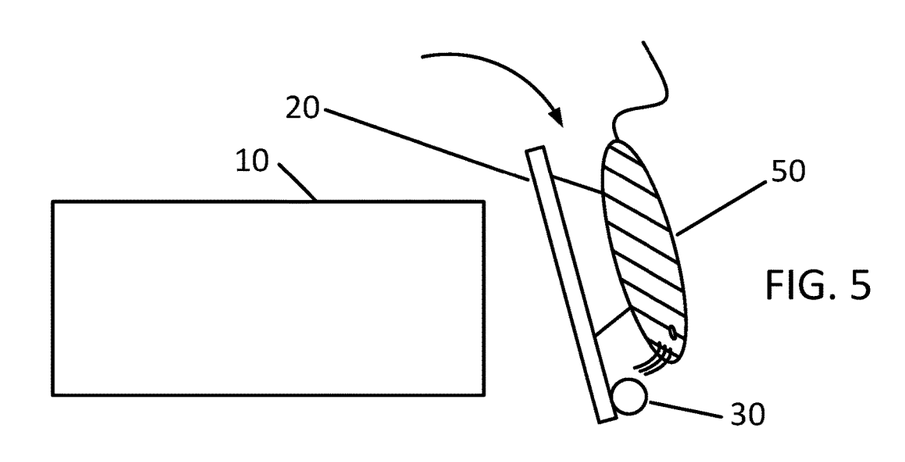
FIG. 5 illustrates the improved mousetrap system of FIG. 3, with the mouse and the unstable platform falling fully off of the table, in accordance with the present disclosure.

FIGS. 3-5 illustrate the improved mousetrap system of FIG. 1 in use. FIG. 3 illustrates the improved mousetrap system of FIG. 1, with a mouse approaching the unstable platform in pursuit of the bait. Table 10 is illustrated, with unstable platform 20 positioned at the table edge with bait 30 in place. Mouse 50 is illustrated approaching unstable platform 20. Because mouse 50 is not upon platform 20, the mouse has no impact upon a center of gravity for the combination of platform 20 and bait 30. FIG. 4 illustrates the improved mousetrap system of FIG. 3, with the mouse stepping fully onto the unstable platform and a center of gravity of the combined mouse and platform going past an edge of the table under the platform causing the mouse and the platform to tip over the edge. Once mouse 50 steps onto unstable platform 20, whether or not platform 20 tips over the edge now depends upon a center of gravity for all of platform 20, bait 30, and mouse 50. As mouse 50 moves toward an end of platform 20 to get bait 30, the center of gravity for all three moves past the edge of table 10, and platform 20 and mouse 50 tip over the edge. FIG. 5 illustrates the improved mousetrap system of FIG. 3, with the mouse and the unstable platform falling fully off of the table. Platform 20 is illustrated falling off table 10, taking mouse 50 and bait 30 with it. With a mouse catching receptacle placed directly under platform 20, mouse 50 is now caught and can be dealt with as desired by the user.

Figure 6:
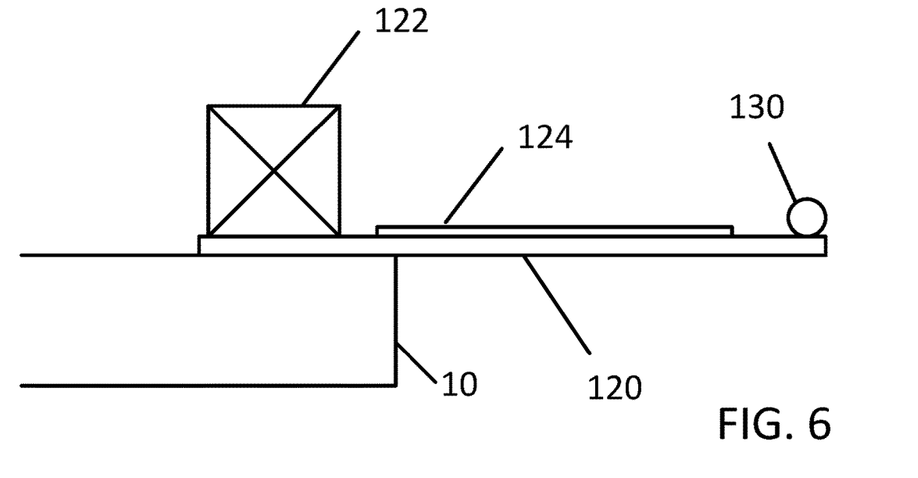
FIG. 6 illustrates an alternative exemplary embodiment of the improved mousetrap system of FIG. 1, with an unstable platform embodied as a stationary platform including a slippery layer of lubricating material along a top side of the stationary platform and with a platform anchor weight keeping the platform stationary relative to the table surface, in accordance with the present disclosure.

FIG. 1-5 illustrate a first embodiment of an unstable platform useful to lure and drop a mouse into a mouse catching receptacle. FIG. 6 illustrates an alternative exemplary embodiment of the improved mousetrap system of FIG. 1, with an unstable platform embodied as a stationary platform including a slippery layer of lubricating material along a top side of the stationary platform and with a platform anchor weight keeping the platform stationary relative to the table surface. Table 10 is illustrated, with unstable platform 120 positioned extending over the edge of table 10. Platform anchor 122 is provided including a weight sufficient enough to keep platform 120 in place even if a mouse moves out onto platform 120. Anchor 122 is usually several times the weight of an average mouse. Anchor 122 can be permanently affixed to platform 120. In other instances, anchor 122 can be separate from platform 120, for example, when platform 120 is intended to be disposable. Slipper layer 124 of lubricating material is added to a top side of platform 120. Layer 124 can be applied at the factory or by the user. As a mouse moves out upon platform 120 to approach bait 130, the feet of the mouse come into contact with slippery layer 124. Testing has shown that mice tend to slip off the sides of such a lubricated platform. By positioning a mouse catching receptacle below platform 120, the mouse can be caught and dealt with by the user.

In one particular embodiment, the platform of FIG. 6 can be a two inch by twelve inch plastic card, approximately 1-2 mm thick. Such a card is flexible and has the added benefit of bouncing up and down slightly as the mouse moves out upon the card. This bouncing of the platform acts like a spring board or diving board, aiding the mouse in losing its footing and slipping off of the platform.

Figure 11:
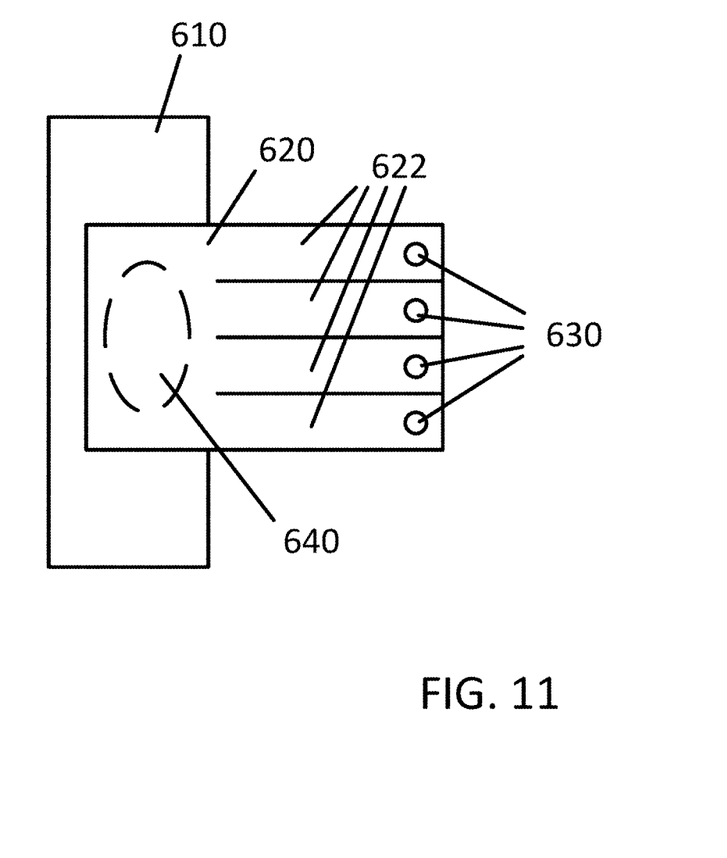
FIG. 11 illustrates an alternative embodiment to the improved mousetrap system of FIG. 6, with a divided overall platform including a plurality of independent unstable platforms, in accordance with the present disclosure.

FIG. 11 illustrates an alternative embodiment to the improved mousetrap system of FIG. 6, with a divided overall platform including a plurality of independent unstable platforms. Divided overall platform 620 is illustrated attached to shelf surface 610. Divided overall platform 620 includes four exemplary attached individual independent unstable platforms 622, each connected to the overall platform 620 but cut into individual sections that can flex separately from each other. Each independent unstable platform 622 includes separate bait 630, and when a mouse goes out on any of the independent unstable platforms 622, that platform can flex and dump the mouse. In the exemplary embodiment of FIG. 11, adhesive 640 is provided on an underside of overall platform 620 for easy attachment to shelf surface 610. One exemplary embodiment of overall platform 620 is twelve inches by eight inches, with each of independent unstable platforms 622 being two inches wide. Lubricant can optionally be used upon the upper surfaces of independent unstable platforms 622 to make the mouse slip off.

Figure 7:
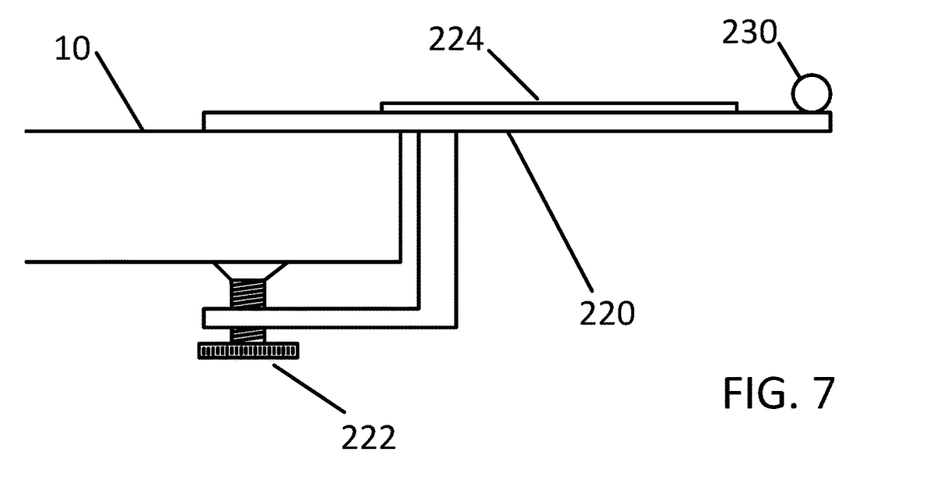
FIG. 7 illustrates an alternative exemplary embodiment of the improved mousetrap system of FIG. 6, with an unstable platform embodied as a stationary platform including a slippery layer of lubricating material along a top side of the stationary platform and with a surface clamp keeping the platform stationary relative to the table surface, in accordance with the present disclosure.

FIG. 7 illustrates an alternative exemplary embodiment of the improved mousetrap system of FIG. 6, with an unstable platform embodied as a stationary platform including a slippery layer of lubricating material along a top side of the stationary platform and with a surface clamp keeping the platform stationary relative to the table surface. Table 10 is illustrated with unstable platform 220 and surface clamp 222 attached to the table. Clamp 222 can take many forms, many types of mechanical clamps are known in the art, and the disclosure is not intended to be limited to the particular example illustrated. Slippery layer 224 is illustrated upon a top surface of platform 220. As a mouse moves out upon platform 220 in pursuit of bait 230, the mouse loses its footing and slips off of platform 220 into a mouse catching receptacle positioned below platform 220.

Slippery layers 124 and 224 can include any number of lubricating materials, including but not limited to cooking spray, vegetable oil, petroleum jelly, etc.

Figure 8:
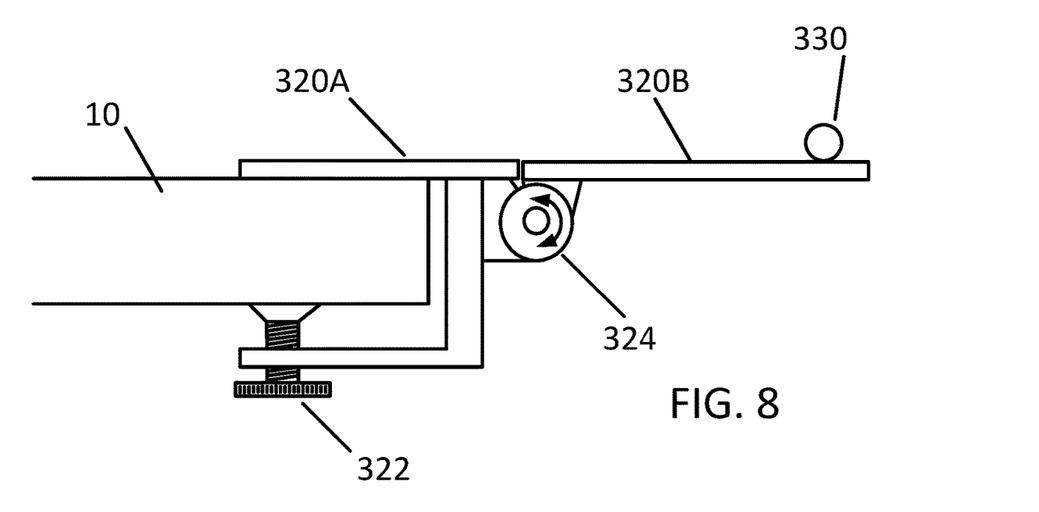
FIG. 8 illustrates an alternative exemplary embodiment of the improved mousetrap system of FIG. 1, with an unstable platform embodied as a collapsing platform including a spring loaded return hinge, in accordance with the present disclosure.

FIG. 8 illustrates an alternative exemplary embodiment of the improved mousetrap system of FIG. 1, with an unstable platform embodied as a collapsing platform including a spring loaded return hinge. Table 10 is illustrated with platform base 320A and surface clamp 322 attached to the table. Spring loaded hinge 324 is illustrated holding collapsing platform 320B in an initial flat orientation, with bait 330 positioned at the end of platform 320B. Platform base 320A and collapsing platform 320B together form an unstable platform. Hinge 324 includes a spring that is biased to keep platform 320B in the illustrated up position, but the spring is calibrated to move in an illustrated clockwise direction, permitting collapsing platform 320B to move or rotate downward into a down position, thereby dumping a mouse upon platform 320B downward into a mouse catching receptacle located below platform 320B. When the mouse is gone, the spring of hinge 324 can automatically move platform 320B back into the illustrated up position.

Figure 9:
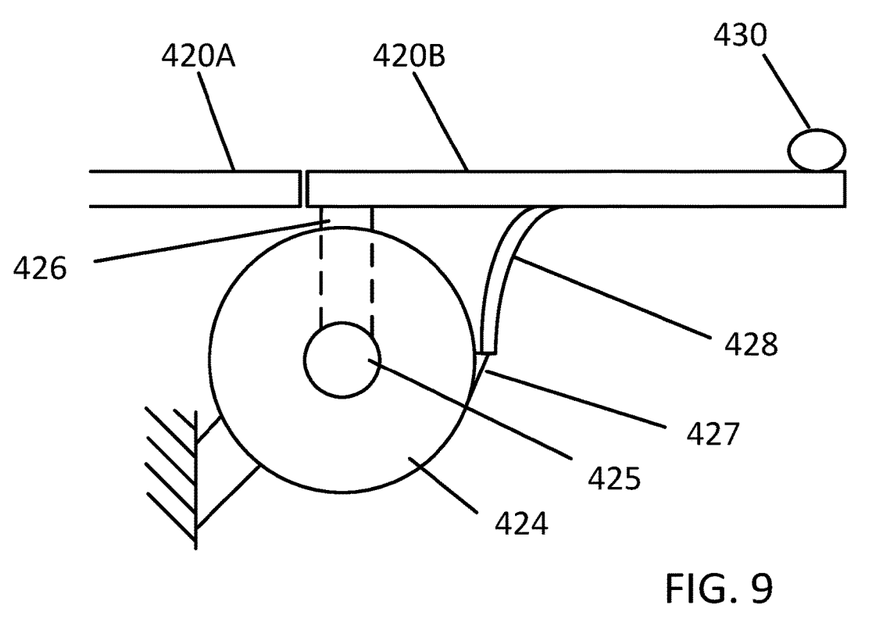
FIG. 9 illustrates an alternative exemplary embodiment of the improved mousetrap system of FIG. 8, with an unstable platform embodied as a collapsing platform including a leaf edge collapsing mechanism, in accordance with the present disclosure.

FIG. 9 illustrates an alternative exemplary embodiment of the improved mousetrap system of FIG. 8, with an unstable platform embodied as a collapsing platform including a leaf edge collapsing mechanism. The illustrated unstable platform includes platform base 420A and collapsing platform 420B. Platform 420B is held in an illustrated up position by leaf edge collapsing mechanism 428 which rests upon catch 427 of hinge mechanism 424. Platform 420B is attached to a pivot 425 with arm 426, such that platform 420 can pivot downward in an illustrated clockwise direction. Leaf edge collapsing mechanism 428 is made of a flexible material such as plastic, such that when a weight calibrated to the weight of an average mouse is upon platform 420B, leaf edge collapsing mechanism 428 flexes, falls off of catch 427, and platform 420 is free to rotate in a clockwise direction into a down position, thereby dumping a mouse in pursuit of bait 430 into a mouse catching receptacle located below platform 420B.

Figure 10:
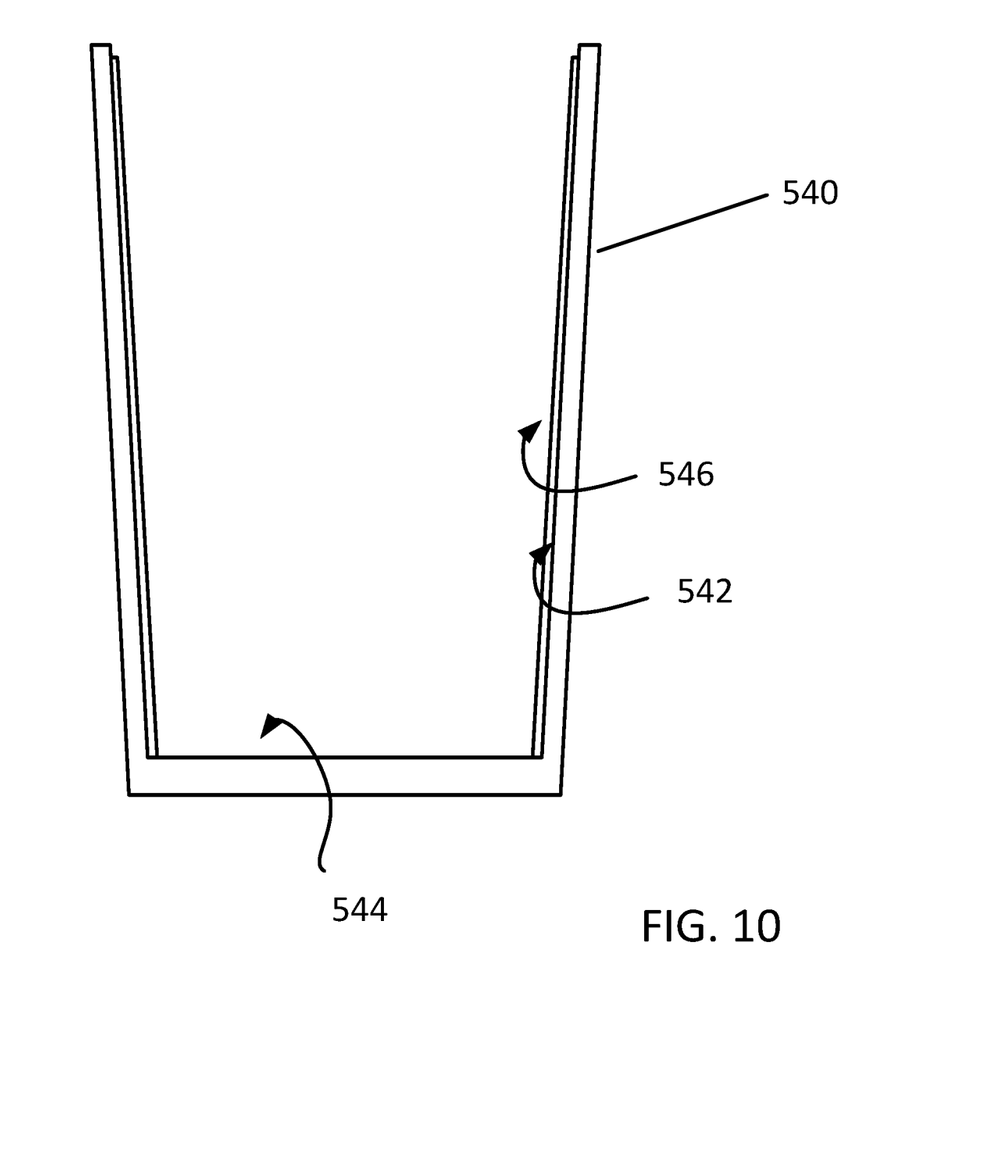
FIG. 10 illustrates an exemplary embodiment of a mouse catching receptacle of FIG. 1, in accordance with the present disclosure.

FIG. 10 illustrates an exemplary embodiment of a mouse catching receptacle of FIG. 1. Mouse catching receptacle 540 can take many forms, including a waste can, an exemplary five gallon bucket, or other similar container. The walls 542 of receptacle 540 are preferably as vertical as possible. In one embodiment, a slippery layer 546 made of cooking spray, vegetable oil, or other similar products can be applied to walls 542. In some embodiments, bottom 544 of receptacle 540 can be empty, thereby enabling the user to release the mouse in a safe location. In other embodiments, conventional mousetraps, a layer of water, or other ways of providing a humane end to the rodent can be located in bottom 544.

Figure 12:
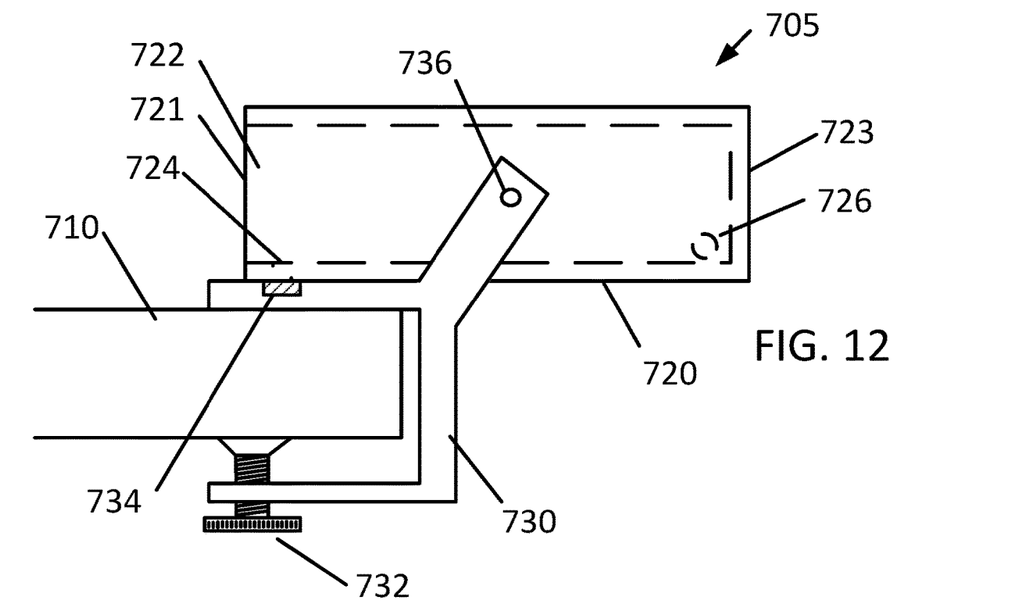
FIG. 12 illustrates an alternative embodiment to the improved mousetrap system of FIG. 1, wherein a rotating tube with one open end and one closed end is suspended in a horizontal orientation, in accordance with the present disclosure.

FIG. 12 illustrates an alternative embodiment to the improved mousetrap system of FIG. 1, wherein a rotating tube with one open end and one closed end is suspended in a horizontal orientation. Mousetrap system 705 is illustrated including an unstable platform embodied as a tube 720 with an open end 721 and closed end 723. Tube 720 is in a horizontal orientation such that internal cavity 722 is open and available to a mouse upon table top 710. Bait 726 is included at an end of cavity 722, enticing a mouse to enter cavity 722 through open end 721. Pivot 736 connects tube 720 to bracket 730 which includes attachment clamp 732 securing bracket 730 to table top 710.

Tube 720 can be initially stable in a horizontal orientation by making more of the weight of tube 720 to the left of pivot 736 than to the right of pivot 736. When a mouse enters cavity 722 and moves toward bait 726, the excess weight of the mouse will cause tube 720 to pivot into a vertical orientation.

In another embodiment, tube 720 can be initially stable in the horizontal orientation through use of a magnet, a releasing clamp, or other mechanical means to hold the tube in the horizontal orientation. However, the magnet, clamp, or whatever is holding tube 720 in the horizontal orientation must be calibrated to release when a typical mouse enters cavity 722. In the embodiment of FIG. 12, a small magnet 734 is illustrated attached to bracket 730, and a small piece of ferrous material 724 is attached to tube 720. The attraction of magnet 734 to ferrous material 724 keeps tube 720 in the initial horizontal orientation until the weight of a mouse within cavity 722 overcomes this attraction and causes tube 720 to rotate.

Figure 13:
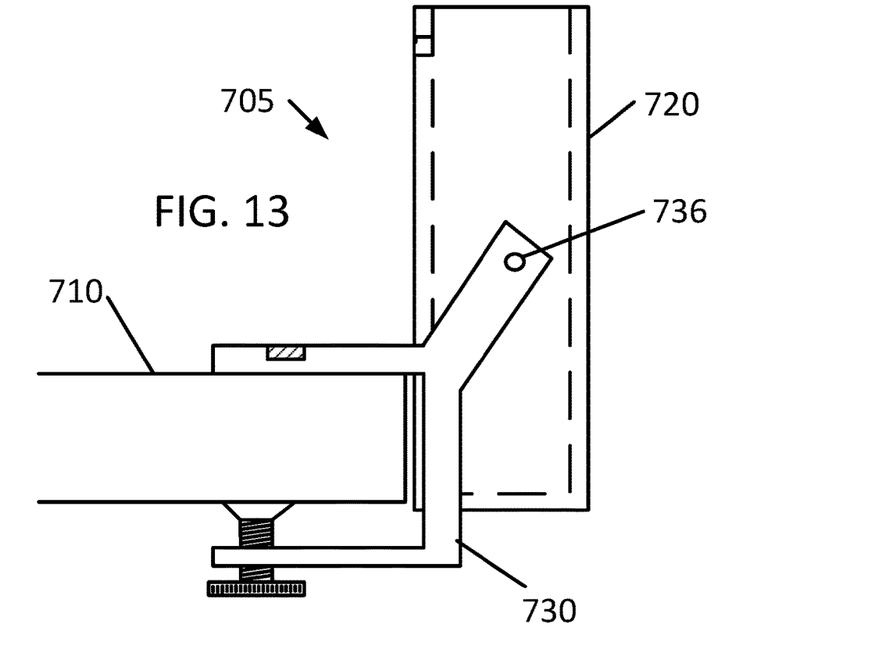
FIG. 13 illustrates the improved mousetrap system of FIG. 12, wherein a mouse has entered the rotating tube, causing the tube to rotate into a vertical orientation, in accordance with the present disclosure.

FIG. 13 illustrates the improved mousetrap system of FIG. 12, wherein a mouse has entered the rotating tube, causing the tube to rotate into a vertical orientation. Mousetrap system 705 is illustrated including bracket 730 attached to table top 710 and tube 720 rotated into a vertical orientation. Tube 720 has rotated about pivot 736, and the mouse within the tube is trapped by its own weight. The tube remains in the vertical orientation until the user comes along and dumps the mouse out. In one embodiment, pivot 736 can be releasable so that the user can simply disconnect tube 720 from bracket 730, dump the captive mouse safely outside the house, and reattach tube 720 to bracket 730 to be used again.

The unstable platforms illustrated herein are shown on tabletops. It will be appreciated that they can be used on any elevated surface, such as shelf surfaces, tool chests, countertops, or other similar household surfaces.

The disclosed system can be used to catch mice. It will be appreciated that the same system or a similar system, for example, with slightly different dimensions, could be used to catch rats, possums, chipmunks, or other similar pests.

The disclosure has described certain preferred embodiments and modifications of those embodiments. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An improved mousetrap system, comprising: an unstable platform configured to rest upon a tabletop surface and extend over an edge of the tabletop surface; bait upon a first end of the unstable platform; an anchor positioned on a second end of the unstable platform opposite the bait, the anchor sufficient enough to keep the unstable platform in place on the tabletop surface when the unstable platform rests on the tabletop surface and extends over the edge of the tabletop surface; and a mouse catching receptacle located below the unstable platform; wherein the unstable platform comprises a card with a bait location indicator and a suggested table edge alignment indicator printed upon the card.

* * * * *